April 30, 1957 H. KLOSTERGAARD 2,790,790
PROTEIN FRACTIONATION
Filed Nov. 10, 1954 3 Sheets-Sheet 2

INVENTOR.
Henry Kostergaard
BY
R.G. Story
ATTORNEY

United States Patent Office 2,790,790
Patented Apr. 30, 1957

2,790,790

PROTEIN FRACTIONATION

Henry Klostergaard, Pasadena, Calif., assignor to Swift & Company, Chicago, Ill., a corporation of Illinois Application November 10, 1954, Serial No. 467,927

7 Claims. (Cl. 260—112)

The present invention relates to the precipitation of proteins from solution, and more particularly to the fractional precipitation of relatively unconjugated proteins from aqueous solution by the use of sodium chloride as the precipitant.

The present invention is a continuation in part of application Serial No. 160,757, filed May 8, 1950, the disclosure of which is incorporated herein.

Sodium chloride has, in the past, had a very limited use as a precipitating agent for proteins. A survey of the literature brings to light statements such as: "Phosphates, citrates and sulfates precipitate proteins in more concentrated solutions at far lower salt concentrations than do chlorides or nitrates. . . . Thus among plasma proteins, fibrinogen has been considered precipitable by half saturation, and euglobulin by saturation with sodium chloride. Both of these proteins are also precipitable, however, by phosphates and sulfates and so are the more soluble serum proteins for which sodium chloride is not a precipitant. . . ." (From Cohn, Esdall: Proteins, Amino Acids and Peptides, 1943, pages 572 and 573.) It has been generally considered that sodium chloride is unsuitable as a precipitant for any but the most readily separable proteins as indicated in the following excerpt from Advances in Protein Chemistry III, page 434: "Sodium chloride can be used to separate some of the proteins most readily salted out."

It is therefore an object of the present invention to provide a method for the precipitation of proteins utilizing sodium chloride as the sole precipitant.

Additional objects, if not specifically set forth herein, will be readily apparent to one skilled in the art from the following detailed description of the invention.

It has now been discovered that, using sodium chloride as the precipitant, rather complete fractionation of simple protein mixtures can be effected within a narrow pH range around pH 3.8. This is a most unexpected result inasmuch as prior art teachings are to the effect that quantitative precipitation, if it can be obtained, is to be found only at the isoelectric point of the protein or can be brought about only by first saturating the protein mixture with sodium chloride and then lowering the pH of the solution. In accordance with the present invention, however, it has been found that fractionation of simple protein components from mixtures thereof can be obtained by a combination of the use of a pH range of approximately 3.6 to 4.0 along with increment addition of quantities of sodium chloride. As the concentration of sodium chloride increases, fractions of simple proteins leave solution and can be readily isolated by separation. The pH value of 3.8 is the approximate mean of the very narrow pH range at which the present invention is carried out. This range has an operable limit of from about pH 3.6 to about pH 4.0, with the range pH 3.7–pH 3.9 being in general the most satisfactory.

The criticality of the pH of about 3.8 is shown by the fact that:

(1) When the protein-containing solution is adjusted at a pH of 4.2 or higher to a sodium chloride concentration at which the protein or mixture of proteins is insoluble at pH 3.8, and the pH of the solution then gradually decreased, the bulk precipitation takes place in a very narrow pH range above 3.8.

(2) When the pH of a protein-containing solution is adjusted to 3.8 or slightly below, the stepwise addition of sodium chloride will precipitate fractions having a narrow range of molecular weights.

Figure 1:
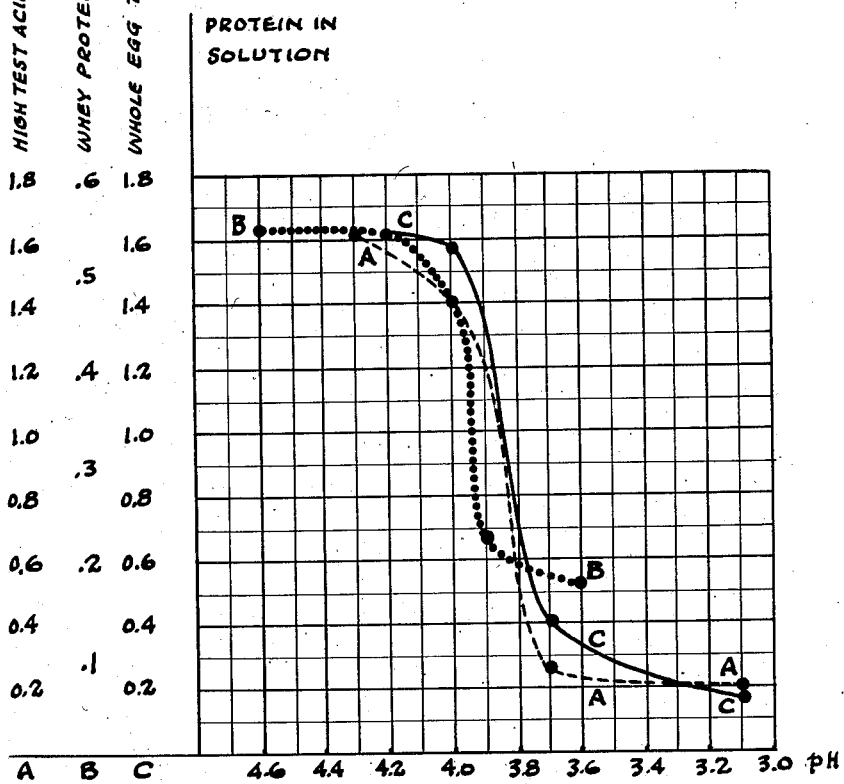
Figure 1 represents a graph on which curves depict the solubility of representative proteins in sodium chloride solutions of indicated concentration at various pH's.
Figure 2:
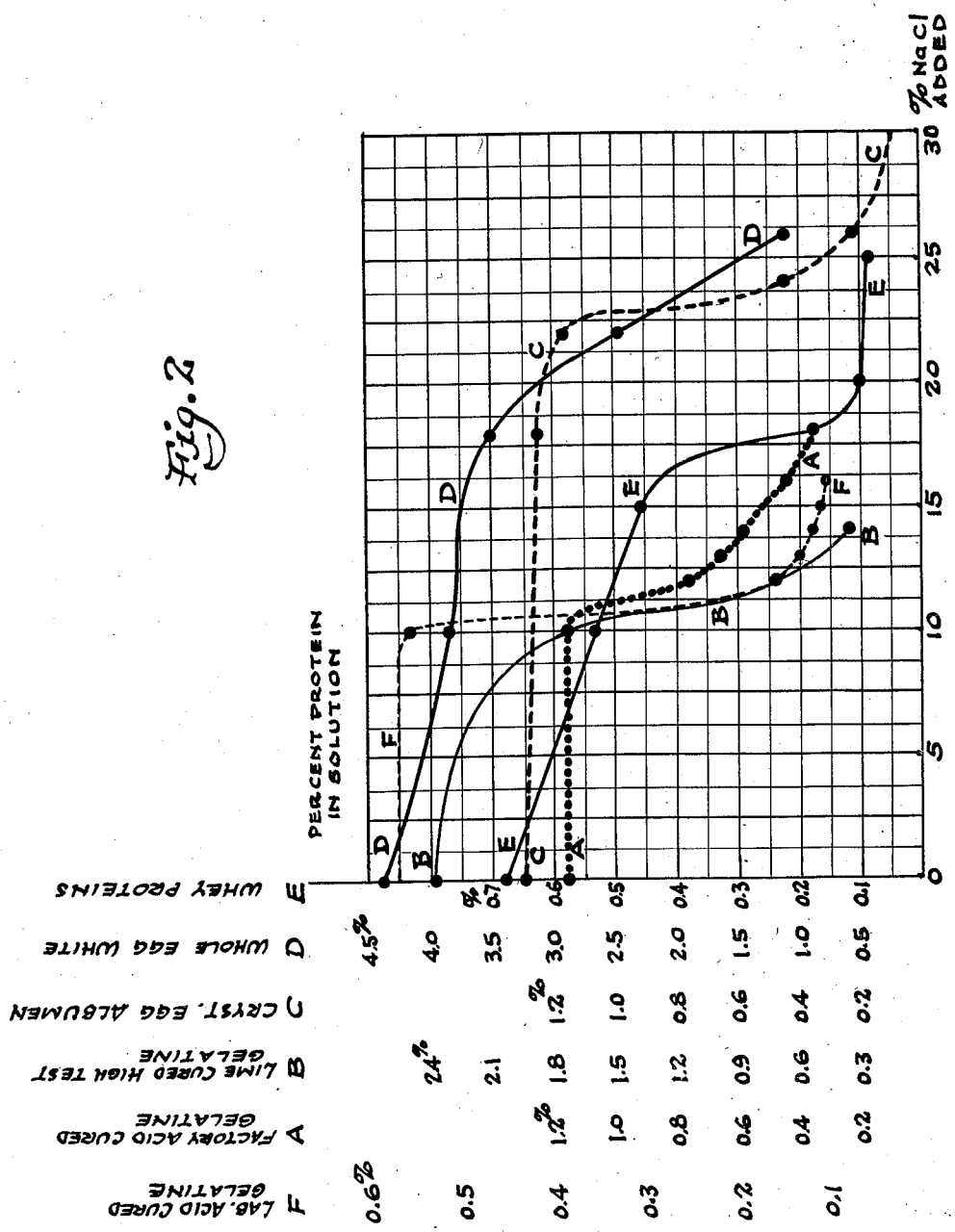
Figure 2 represents a graph showing the effect on the solubility of components of representative protein mixtures by varying the sodium chloride concentration while maintaining the pH of the solution constant at approximately 3.6.
Figure 3:
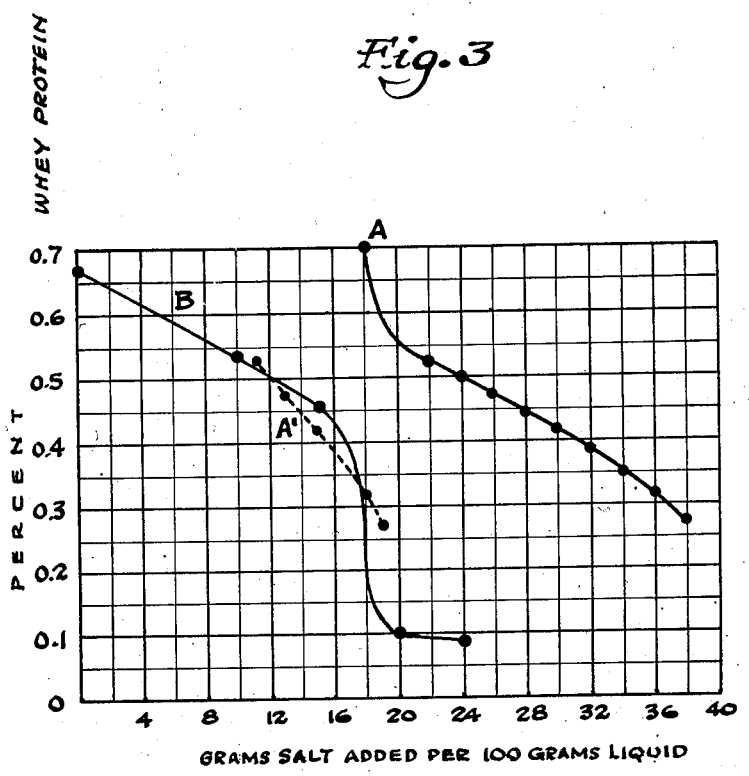
Figure 3 represents a graph on which the solubility of whey proteins in an ammonium sulfate solution and in a sodium chloride solution at a pH of approximately 3.6 is plotted against the grams of salt added to 100 grams of liquid.

It is believed that reference to the accompanying graphs as shown in Figures 1 through 3, Figure 2 in particular, will more clearly indicate the method of the present invention.

Referring now to Figure 1, it will be seen that the abscissa represents change in pH of the solution while the ordinate represents change in solubility of the protein, expressed as percent protein in solution. Three typical proteins are disclosed in this graph: curve A representing the change in solubility of high test acid gelatin in a solution having a sodium chloride concentration of 14%; curve B representing the change in solubility of whey protein in a 25% sodium chloride solution; and curve C representing the change in solubility of whole egg white protein in a 24% sodium chloride solution. The sodium chloride concentrations set forth here are determined by experimentation to be sufficiently high to cause the proteins in the solutions to be insoluble at a pH of 3.8. The concentrations are not critical in the sense that increase or decrease thereof would affect the pH value of the "drop" precipitation. For example, the whey protein solution shows less than a 0.1 change in pH value for "drop" precipitation when the NaCl concentration is increased from 25% to 40% NaCl added. It will be seen from Figure 1 that in all three cases a very sharp precipitation of protein occurs in the narrow range between 3.7 and 4.0 pH. It is obvious that such a treatment will effect a very efficient separation of proteins from a mixture of proteins and other materials, but will not necessarily give a good fractionation of individual protein elements from a mixture of proteins. Blood proteins and soya albumen act similarly.

In order to effect such a fractionation, the solution containing a mixture of proteins, obtained as shown in Figure 1 or otherwise, is adjusted to a pH of 3.8 or slightly below, for example, to 3.6, and sodium chloride is added in a stepwise manner to effect a fractional precipitation of the individual proteins while carefully maintaining the pH within the range 3.6–3.8. This treatment is illustrated in Figure 2 of the drawings. The abscissa of the graph of Figure 2 represents percent sodium chloride added, while the ordinate represents, as in Figure 1, the solubility of the protein expressed as percent protein in solution. Five curves are plotted on this graph: curve A representing the change in solubility of factory-prepared, acid-cured gelatin; curve B representing a change in solubility of lime-cured, high-test gelatin; curve C representing the change in solubility of crystalline egg albumen;

curve D representing the change in solubility of whole egg whites; curve E representing the change in solubility of whey proteins; and curve F representing the change in solubility of laboratory-prepared, acid-cured gelatin. All solutions were maintained at a pH of approximately 3.6. It will be noted that the graph depicts clearly the outstanding precipitating properties of sodium chloride within the critical pH range specified. The following examples illustrate the method in which the various curves of Figure 2 were obtained.

*Example I*

A 500 gram solution of 0.56% acid-cured gelatin was adjusted to a pH of 3.8. 50 grams of NaCl were added slowly accompanied by stirring. No precipitate was formed. Upon subsequent addition of 10 grams of NaCl, a good precipitate formed. The supernatant was found to contain 0.0311% $N_2$ which when corrected for the salt added and converted into gelatin corresponded to 0.157% gelatin. Five more grams of NaCl brought this figure down to 0.130% gelatin remaining in solution. In this manner, the following table was obtained:

| NaCl Added | Gelatine in Solution |
|---|---|
| Percent | Percent |
| 0 | 0.56 |
| 10 | 0.56 |
| 12 | 0.157 |
| 13 | 0.130 |
| 14 | 0.118 |
| 16 | 0.102 |

As the above table indicates, the gelatin was separated into various fractions. Approximately 75% was precipitated at from 10 to 12% NaCl and subsequent molecular weight determinations showed this fraction to be of a higher molecular weight than the fractions remaining in solution at 12% NaCl. The above information was utilized to form Curve F in Figure 2.

*Example II*

A sample of acid whey from raw milk was considered for the purpose of isolating crystalline B-lactoglobulin. To determine the percent NaCl necessary to precipitate B-lactoglobulin at a pH of 3.8, a 0.1% B-lactoglobulin solution was prepared and quantities of NaCl were added until the first precipitate appeared. Precipitation occurred at 15% NaCl. The acid whey sample was adjusted to a pH of 3.8 and increments of NaCl were added with a $N_2$ determination made with respect to the supernatant upon the addition of each increment of NaCl. The following table similar to that set forth in Example I was determined:

| NaCl Added | Protein in Solution |
|---|---|
| Percent | Percent |
| 0 | 0.67 |
| 10 | 0.535 |
| 15 | 0.455 |
| 20 | 0.100 |
| 25 | 0.087 |

As can be seen from the above data, the largest drop in protein concentration occurred from 15% to 20% NaCl concentration. This particular range coincides with the critical NaCl concentration for B-lactoglobulin which was previously determined. Isolation procedure for B-lactoglobulin is thereby fully determined as it is merely necessary to acidify whey to a pH of 3.8 and add 15% NaCl. The B-lactoglobulin precipitate can then be removed and to the filtrate additional quantities of NaCl can be added to bring the concentration of NaCl to 20%. The remaining precipitate can be removed and combined with the original quantities recovered and the total precipitate dialyzed in the usual manner to form crystalline B-lactoglobulin. The data set forth above forms the Curve E in Figure 2.

*Example III*

In the manner set forth above in Example I, the following data was obtained as a result of increment addition of NaCl to a solution of egg albumin maintained at a pH of 3.8.

| NaCl Added | Protein in Solution |
|---|---|
| Percent | Percent |
| 0 | 1.297 |
| 18 | 1.243 |
| 22 | 1.166 |
| 24 | 0.442 |
| 26 | 0.212 |
| saturation | 0.031 |

From the above, it is clear that egg albumin begins to precipitate at an NaCl concentration of approximately 22% and that over 80% of the albumin is removed from solution at approximately 26% NaCl concentration. The above data was used to form Curve C of Figure 2.

*Example IV*

Similar procedures were followed in connection with egg whites. The following data was obtained upon the adjustment of a solution of egg whites to a pH of 3.8.

| NaCl Added | Protein in Solution |
|---|---|
| Percent | Percent |
| 0 | 4.35 |
| 10 | 3.83 |
| 18 | 3.50 |
| 22 | 2.45 |
| 26 | 1.12 |

As previously shown in Example III, albumin precipitates perceptively within a range of 22 to 26% NaCl concentration. This particular range is further borne out in the above data inasmuch as at a concentration of 18 to 26% NaCl, there is a marked decrease in solubility of the protein in solution. Within this range of NaCl concentration, albumin is precipitated from egg whites and subsequent increase in NaCl concentration results in fractionation of the remaining protein into various components which have not been identified. The above data was used to form curve D in Figure 2.

The following facts are apparent from the results shown in Figure 2.

*a.* The proteins begin precipitating at a definite concentration of sodium chloride according to their origin—the gelatins within a range of 10 to 11% sodium chloride added, the whey proteins within a range of 16 to 18% sodium chloride added, and the egg proteins within the range of about 20 to 25% sodium chloride added.

*b.* The larger molecules, such as the gelatins, require lower concentrations for precipitation.

*c.* The factory-prepared gelatin deviates a bit from the laboratory preparations, indicating the presence of some material of lower molecular weight, which, as is well known, is caused by the rougher treatment in plant condensing.

*d.* The protein mixtures are fractionally precipitated as the concentration of sodium chloride increases.

It is the latter observation, namely (*d*), that forms the essence of the present invention. As can be seen on the curves set out in Figure 2, the large solid circles represent the concentrations at which the precipitation of a new single component of the mixture begins and precipitation of the preceding component ends. For example, referring to curve A representing the fractionation phenomena of factory acid cured gelatin, it can be clearly seen that at a sodium chloride concentration of 10% precipitation of a component of the mixture begins and this component is almost completely removed from solution as the sodium chloride concentration approaches approximately 12%. The components are separated from solution in accordance with their molecular weights and each component upon precipitation can be isolated, purified and identified. As a further example, for each solution of proteins obtained in a plant, there will be a curve like those set forth in Figure 2. If it is desired to isolate crystalline B-lactoglobulin reference can be made to curve E where it can be seen that between 16 and 20% NaCl there is a sudden drop in protein in solution. This indicates that the precipitate is of rather uniform molecular weight. Actually, it has been determined that this fraction is B-lactoglobulin with rather small amounts of impurities. The precipitate on dialysis gives crystalline material of high purity.

The following will illustrate a preferred procedure of determining the NaCl concentration necessary to fractionate a protein mixture to obtain a substantially pure protein component thereof using an industrial source of proteins as an example:

(A) (1) Adjust the pH of a sample of an industrial protein solution to 3.8 or slightly below. Add NaCl until all protein is precipitated (nitrogen determination of filtrate). Let $s\%$ equal amount of NaCl required.

(2) Add $s\%$ NaCl to the batch of industrial solution to be treated and dissolve quickly. Filter and adjust filtrate to pH 3.8 or slightly lower. Collect protein by filtration and discard filtrate.

(B) (1) Re-disperse protein precipitate of (A) (2) in water, adding NaOH to help solution.

(2) Adjust pH of a sample of solution (B) (1) to 3.8 or slightly below. Add 5% NaCl, filter and examine precipitate for the desired protein (i. e., by chemical analysis, spectra, biological activity, electrophoretic mobility, sedimentation constant or the like). Repeat this step, filtering and examining precipitate each time until the saturation point is reached. By this method it is easy to determine the salt concentration ($s_1\%$) at which the desired protein component starts precipitating and the salt concentration ($s_2\%$) at which no more of the desired protein component is precipitated.

(3) Then to the batch solution of (B) (1) or to the original industrial solution, at pH 3.8 or slightly below, add $s_1\%$ NaCl and dissolve quickly. Remove precipitate.

(4) To the filtrate of (B) (3) add NaCl until a concentration of $s_2\%$ is reached, dissolve quickly and collect the desired protein fraction by filtration or otherwise.

The above procedure is a highly desirable commercial procedure which can be followed to obtain a certain desired protein fraction on a commercial plant scale. As can be seen from the above illustration, the amount of NaCl necessary to obtain precipitation of the protein present can be determined by adjusting the pH of a sample and adding NaCl to the sample until all protein material is precipitated. The amount of NaCl necessary for mass precipitation is thereby determined and no waste occurs as a result of using excessive amounts during actual commercial treatment. The percent NaCl necessary to mass precipitate the protein present in the particular industrial source being treated is known and can be used to obtain mass precipitation of the protein in the main body of industrial material. Mass precipitation is then carried out and all of the protein collected is redissolved for fractionation. By adding increments of NaCl to a sample having an adjusted pH, the exact concentration of NaCl capable of precipitating a particular component can be determined. If then a particular component is desired, the redissolved mixture can be treated with the determined amount of NaCl to obtain precipitation of the desired fraction. If fractionation of the entire mixture is desired, predetermined increments of NaCl capable of precipitating various components can be added to the redissolved mixture and the fractions obtained can be readily isolated.

A comparison of the effectiveness of sodium chloride in the precipitation of whey proteins as opposed to the conventional use of a salt, such as ammonium sulfate, is shown in Figure 3 of the drawings. This figure illustrates a graph whereon the solubility of whey proteins (as percent protein in solution) is plotted against the grams of salt added per 100 grams of liquid. Curve A represents the solubility in an ammonium sulfate solution. Curve B represents the solubility in a sodium chloride solution having a pH of 3.6. Curve A' is identically the same as curve A except that the abscissa unit is reduced 50% (i. e., where 16 is read on the abscissa, it stands for 32 grams $(NH_4)_2SO_4$ added). This enables the transposition of curve A to the position shown in A' so that the great increase in selectivity of the sodium chloride precipitation is more readily apparent. Both curves A and B should be considered only for protein content less than 0.52%, since the excess represented by the upper portions of the curves is "late" casein and not the relatively unconjugated proteins which are water soluble around pH 3.8 and which are the class of proteins treated in the present invention. From the curves it is at once apparent that sodium chloride is a more efficient precipitating agent than ammonium sulfate. It requires approximately twice as much or more ammonium sulfate to obtain the same precipitation as obtained by the use of sodium chloride. The economic advantages of sodium chloride are obvious since this compound is approximately 1/25 of the cost of ammonium sulfate. Comparing curves B and A', it will be seen that for between 16–19% NaCl added, a reduction in protein remaining in solution of 0.32% is obtained. Between the same two points (representing 32–38% $(NH_4)_2SO_4$ on curve A'), it will be seen that a reduction of only 0.12% is obtained. Hence, it is obvious that NaCl is much more selective.

The well-known crystalline protein, B-lactoglobulin, which is a major part of the whey proteins can be isolated from the whey directly only with great difficulty by using ammonium sulfate, and when so obtained it is in impure form. (See S. P. L. Sorensen: The Proteins in Whey, C. r. d. Travaux Laboratoire Carlsberg, volume 23, No 7, 1939, page 69, from which work the data plotted for $(NH_4)_2SO_4$ in Figure 3 was also obtained.) Using sodium chloride, it is rather easy to obtain a crystalline protein of good purity by first precipitating with 16% NaCl and filtering to remove impurities, and then adding NaCl to the filtrate in a stepwise manner until substantially complete protein precipitation at a concentration of 20% NaCl is reached, maintaining the pH constant at about 3.6 throughout. A similar effect is obtained with egg white. In the fractionation of blood protein, the albumens (a large part of the total protein content) are not precipitable by ammonium sulfate. However, using NaCl, saturation of the solution at a pH of 3.6 leaves so little protein in solution that only a slight cloudiness is obtained on boiling. The precipitate may be readily recovered by filtration.

It is therefore apparent from the foregoing description that the present invention provides a practical and efficient method for both separating a mixture of proteins from a solution and for fractionating a mixture of proteins to obtain substantially pure individual protein components thereof. As disclosed above, the present method is considered applicable to all protein materials, which are water-soluble in a reasonable pH range around pH 3.8, which form a highly dispersed, colloidal solution, and which do not contain so high an amount of prosthetic groups as will erase the typical "drop" precipitation obtained herein. The term "relatively unconjugated" is used herein to mean proteins containing only minor amounts of the prosthetic groups such as carbohydrates, fatty acids, alkanolamines, etc. This eliminates from the scope of the invention certain enzymes and hormones such as some of the pituitary hormones which contain relatively large amounts of prosthetic groups, and also indicates the invention to be applicable only to a limited extent to the vegetable proteins in which the prosthetic groups are so predominant that they can be exploited alone for the precipitation. Examples of typical, relatively unconjugated, proteins are whey, blood, gelatin, whole egg white, crystalline egg albumen, soya albumen and the like.

It is to be noted that in the data presented in Figures 1 through 3, no correction has been made for salt effect or protein error on the pH as measured by using a glass electrode.

Obviously, many modifications and variations of the invention as hereinbefore set forth may be made without departing from the spirit and scope thereof, and therefore only such limitations should be imposed as are indicated in the appended claims.

I claim:

1. A method for substantially complete recovery of relatively unconjugated simple proteins having widely varying isoelectric points from a solution containing such proteins which comprises: adjusting the pH of said solution to approximately 3.8; and adding sodium chloride in successive increments to said solution whereby to precipitate out various proteins from said mixture as the sodium chloride concentration is increased.

2. In a method for obtaining substantially purified, individual, relatively unconjugated simple proteins having widely varying isoelectric points from a mixture of such proteins and other materials in solution wherein said proteins are first separated from the other materials and then fractionated into individual components, the steps which comprise: forming a solution of said separated, relatively unconjugated simple proteins; adjusting the pH of this solution to approximately 3.8; and adding sodium chloride in successive small increments to said solution at said pH, thereby precipitating out the individual proteins from the mixture of proteins in solution as the sodium chloride concentration is thus gradually increased.

3. In a method for obtaining substantially purified, individual, relatively unconjugated simple proteins having widely varying isoelectric points from a mixture of such proteins and other materials in solution wherein said proteins are first separated from the other materials and then fractionated into individual components, the steps which comprise: forming a solution of said separated, relatively unconjugated simple proteins; adjusting the pH of said solution to within the range 3.6–3.8; adding sodium chloride to said solution in a step-wise manner, precipitating out individual proteins at said pH as the sodium chloride concentration is thus gradually increased; and separating out the individual proteins so precipitated.

4. A method for obtaining substantially purified, individual, relatively unconjugated simple proteins having widely varying isoelectric points from a mixture of such proteins and other materials in solution comprising: adding at least sufficient sodium chloride to said solution at a pH above about 4.2 to cause said mixture of relatively unconjugated simple proteins to be insoluble at a pH of about 3.8; lowering the pH of said solution to about 3.8, thereby precipitating out said mixture of relatively unconjugated simple proteins; redissolving said mixture of relatively unconjugated simple proteins to form a new solution; adjusting the pH of said new solution to about pH 3.8; adding sodium chloride to said new solution at said pH in a step-wise manner; precipitating out individual proteins as the sodium chloride concentration is thus gradually increased; and separating out the individual proteins so precipitated.

5. A method for obtaining substantially purified, individual, relatively unconjugated simple proteins having widely varying isoelectric points from a mixture of proteins and other materials in solution comprising: adding an amount, at least sufficient to quantitatively precipitate said unconjugated proteins from said solution at a pH of from 3.6 to 4.0, of sodium chloride to said solution at a pH about 4.2; reducing the pH of the solution to within the range 3.6–4.0 to precipitate out the mixture of relatively unconjugated simple proteins; redissolving said mixture of relatively unconjugated simple proteins in water to form a new solution; adjusting the pH of said new solution to within the range 3.6–3.8; adding small amounts of sodium chloride in a step-wise manner to said new solution at said pH; precipitating out individual protein components from said mixture of proteins in solution as the sodium chloride concentration is thus gradually increased; and separating out the individual proteins so precipitated.

6. A method for obtaining a substantially purified, individual, relatively unconjugated simple protein from a mixture of relatively unconjugated simple proteins having widely varying isoelectric points comprising: taking a sample of said mixture and adjusting the pH of said sample to approximately 3.8; adding increments of sodium chloride to said sample and isolating the components precipitating therefrom; identifying said protein from among said components; adjusting the pH of said mixture to approximately 3.8; and thereafter, treating said mixture with the concentration of sodium chloride necessary to precipitate said protein therefrom.

7. A method for obtaining a substantially purified, individual, relatively unconjugated simple protein from a mixture of relatively unconjugated simple proteins having widely varying isoelectric points comprising: adjusting the pH of said mixture to within the approximate range of 3.6 to 4.0; adding increments of sodium chloride to a sample of said mixture and isolating the components precipitating therefrom; identifying said protein from among said components; and thereafter, treating said mixture with the concentration of sodium chloride necessary to precipitate said protein therefrom.

References Cited in the file of this patent

UNITED STATES PATENTS 2,006,700   Supplee et al. _____ July 2, 1935

FOREIGN PATENTS 173,831   Great Britain _____ Jan. 13, 1922

OTHER REFERENCES

Anson et al.: "Advances in Protein Chem.," vol. III, pp. 432–6 (1947).

Anson et al.: "Advances in Protein Chem.," vol. II, pp. 347–8 (1945).

Anson et al.: "Advances in Protein Chem.," vol. V, p. 205.